United States Patent [19]

Hart

[11] 4,235,477
[45] Nov. 25, 1980

[54] VARIABLE LOAD VALVE DEVICE

[75] Inventor: James E. Hart, Trafford, Pa.

[73] Assignee: American Standard Inc., Wilmerding, Pa.

[21] Appl. No.: 20,676

[22] Filed: Mar. 15, 1979

[51] Int. Cl.³ .............................................. B60T 8/22
[52] U.S. Cl. .................................................. 303/22 R
[58] Field of Search ........... 188/195; 303/22 A, 22 R, 303/23 R

[56] References Cited

U.S. PATENT DOCUMENTS 4,080,005   3/1978   Engle .................................. 303/22 R Primary Examiner—Duane A. Reger
Attorney, Agent, or Firm—G. J. Falce; R. W. McIntire, Jr.

[57] ABSTRACT

A variable load valve device for modulating brake cylinder pressure on railway freight cars according to the actual vehicle load weight. A load sensing arm detects variations between the sprung and unsprung members of the vehicle to vary the tension of a pair of springs, one of which bias a proportioning valve to a normally closed position and the other of which biases a cut-off valve to a normally open position. The proportioning valve controls fluid pressure communication between the brake cylinder and a volume reservoir, such that when the proportioning valve spring tension is overcome by the brake cylinder pressure, the brake cylinder pressure will be modulated by flowing to the volume reservoir. By reason of the variable spring tension with load, the level of brake pressure at which modulation occurs increases with increased load so that the degree of brake pressure modulation reduces as the load increases. Light brake applications at low load weights may be unmodulated or only slightly modulated, while heavier brake applications are fully modulated.

The cut-off valve operates to cut-off supply of pressure (auxiliary reservoir) to the brake cylinder when this pressure reaches a value corresponding to "full equalization" to prevent an overreduction of brake pipe pressure from affecting the modulated brake pressure. Changes in the modulated brake pressure with load variations are compensated by the load adjusted bias spring to assure cut-off at full equalization value regardless of the modulation pressure.

14 Claims, 2 Drawing Figures

VARIABLE LOAD VALVE DEVICE

BACKGROUND OF THE INVENTION

The present invention is related to fluid pressure brake apparatus for a railway vehicle and more particularly to fluid pressure brake apparatus embodying means for automatically adjusting the degree of brake application in accordance with varying load conditions of a railway freight vehicle.

Typically, load adjusted fluid pressure brake control apparatus for railway vehicles operating in freight service employs empty/load type brake control, which is a two-step control wherein normal brake pressures are realized under load conditions and a modulated brake pressure is realized under empty conditions of vehicle loading. In modulating brake pressures under empty conditions, the occasion of slid flat wheels, as well as rough train action due to differently loaded cars or groups of cars is eliminated.

Because of the various load conditions of the freight cars comprising a train, however, empty/load type brake control is not completely satisfactory, since cars having a partial load may be underbraked or overbraked depending upon the preselected changeover point between the empty/load setting. This situation is even more critical with the modern lightweight cars, which have a wider range between their gross and tare weights.

SUMMARY OF THE INVENTION

It is therefore an object of the present invention to provide a variable load valve device for modulating brake pressure, the amount of pressure modulation being predicted on both the intensity of the brake application and the effective vehicle load.

It is a further objective that, for a given load, light brake applications are unmodulated or modulated only slightly, with heavier brake applications being increasingly modulated.

It is still another objective of the invention that, for a given brake application, the degree of brake pressure modulation decreases with increasing vehicle load.

Yet another object of the invention is to prevent over-reductions of brake pipe pressure from influencing the modulated brake pressure.

In achieving these objectives, there is interposed in the brake cylinder pipe leading from an AB/D brake control valve device a variable load valve device having a sensing arm arranged to engage the unsprung portion of a railway vehicle when the variable load valve device is mounted on the sprung portion of the vehicle. The variable load valve device further includes a poppet-type proportioning valve that is biased toward its closed position by a spring having a seat connected to the sensing arm, so that the spring compression is varied with the deflection of the sensing arm in order to adjust the bias on the proportioning valve in accordance with the vehicle load. The spring side of the proportioning valve is connected to a volume reservoir, while the opposite side is subject to auxiliary reservoir pressure supplied to the brake cylinder from the AB/D control valve during a brake application.

When the buildup of brake cylinder pressure is sufficient to overcome the load adjusted bias spring acting on the proportioning valve, the proportioning valve is opened to connect auxiliary reservoir pressure from the AB/D control valve to the volume reservoir in parallel with the brake cylinders. At this point, modulation of brake pressure is initiated by reason of the larger total volume into which the auxiliary reservoir pressure is equalized until proportioning valve 26 subsequently closes. The level at which this pressure modulation occurs increases with increased vehicle load. This is made possible by the combined effect of the bias spring and differential pressure area of the proportioning valve.

Also included in the variable load valve ahead of the proportioning valve is a poppet-type cut-off valve, which is biased to an open position by a spring having a seat connected to the sensing arm, so that the spring compression is varied with deflection of the sensing arm. The poppet cut-off valve is provided with a differential pressure area subject on one side to the auxiliary reservoir pressure and on the opposite side to the effective brake cylinder pressure. The differential pressure areas and the bias spring are selected such that for a given brake pipe charge and a given load, the poppet cut-off valve will close to interrupt further supply of auxiliary reservoir pressure to the brake cylinder when the auxiliary reservoir pressure corresponds to normal full service equalization pressure. Accordingly, auxiliary reservoir pressure will be prevented from flowing to the brake cylinder in the event of an overreduction of brake pipe pressure, thereby preserving the modulated brake cylinder pressure.

BRIEF DESCRIPTION OF THE DRAWING

Other objects and advantages of this invention will become apparent from the following more detailed description when taken with the accompanying drawing in which.

DESCRIPTION AND OPERATION

Figure 1:
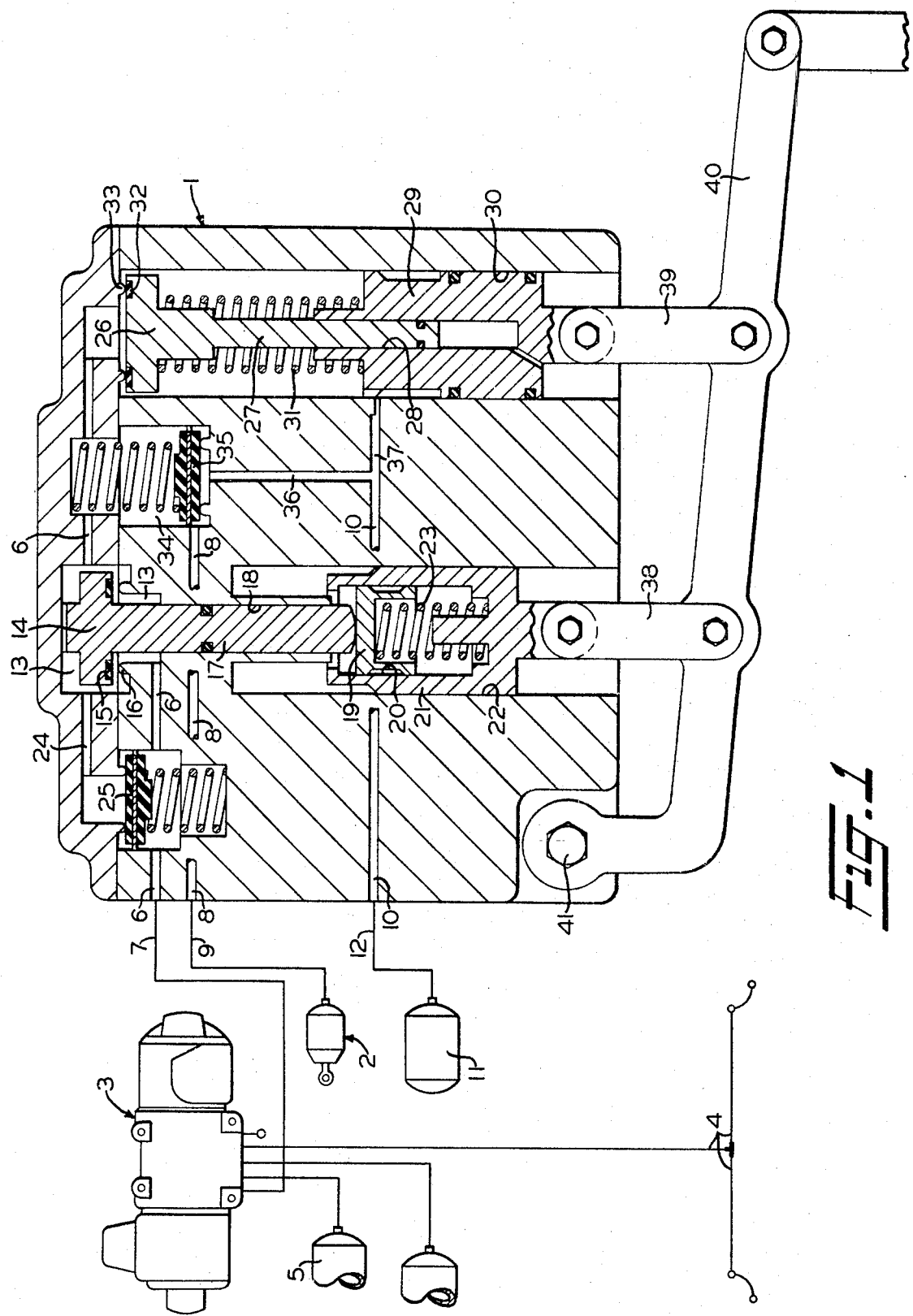
FIG. 1 shows a section elevation view of the variable load valve device of the present invention connected in a freight brake control system.

A variable load valve device 1 is interposed between a brake cylinder device 2 and a freight brake control valve device 3, such as a conventional AB/D type brake control valve device manufactured by the Westinghouse Air Brake Company. As is well known in the art, this control valve device 3 operates on the pressure equalization principle in response to reductions of pressure in a brake pipe 4, whereby the pressure stored in an auxiliary reservoir 5 is connected via the control valve service piston (not shown) to brake cylinder device 2 until the auxiliary reservoir pressure effective on one side of the control valve service piston is reduced slightly below the brake pipe pressure on the opposite side thereof. When this occurs, equalization of the higher auxiliary reservoir pressure with brake cylinder pressure is terminated by movement of the service piston from application lap position. Full or complete service equalization occurs when the brake pipe pressure is reduced to a level corresponding substantially to the pressure in the auxiliary reservoir and brake cylinder when full equalization of pressure occurs therebetween.

Variable load valve device 1 comprises an inlet passage 6 to which a delivery pipe 7 of control valve device 2 is connected, an outlet passage 8 to which brake cylinder device 1 is connected via pipe 9 and a passage 10 to which a volume reservoir 11 is connected via a pipe 12.

Formed in passage 6 is a cavity 13 containing a poppet-type cut-off valve 14 having an annular seal ring 15 engageable with an annular seat 16 of the valve casing forming cavity 13. A stem 17 of cut-off valve 14 extends through a guide bore 18 into engagement with a spring seat 19 that is caged within a bore 20 of a cylindrical member 21 that operates within a counterbore 22 in the casing of valve device 1. Disposed between spring seat 19 and the bottom of bore 20 is a spring 23 that urges poppet valve 14 in a direction to unseat seal ring 15 from its seat 16, as shown. A passage 24 connects cavity 13 downstream of valve seat 16 to inlet passage 6 at the upstream side of valve seat 16 via a one-way release check valve 25.

A poppet-type proportioning valve 26 is provided with a stem 27 that is supported in a guide bore 28 formed in a cylindrical member 29 that operates within a bore 30 in the casing of valve device 1. A spring 31 is disposed in bore 30 between cylindrical member 29 and poppet valve 26 so as to urge the poppet valve in a direction in which an annular seal ring 32 thereof is engaged within an annular valve seat 33. The area within annular seal ring 32 is connected to passages 6 and 8 via a cavity 34 in which is carried a one-way release check valve 35. One branch 36 of passage 10 is connected to the underside of one-way check valve 35 and another branch 37 of passage 10 is connected to the bore 30 in which cylindrical member 29 operates.

Cylindrical members 21 and 29 are each connected by a respective extension link 38 and 39 to a sensing arm 40 that is pivotally connected at one end by a suitable bolt 41 to the body of variable load valve device 1. The sensing arm 40 is arranged to engage an unsprung portion of a railway vehicle, such as the vehicle brake beam (not shown), while the variable load valve device itself is mounted to the sprung portion of the railway vehicle, such as the underside of the car body, preferably along the car centerline where sway and rocking motion is minimized.

SERVICE BRAKE APPLICATION—FULL LOAD

In the full load condition of a railroad car equipped with a variable load valve device 1 of the present invention, load sensing arm 40 is rotated about its pivot point at bolt 41 in a counterclockwise direction, as viewed in the drawing, thereby placing springs 23 and 31 under maximum compression. With the brakes released, as hereinafter explained, the force exerted by these springs urges poppet valve 14 to its open position, as shown, and urges poppet valve 26 to its closed position, as shown.

When a service brake application is made, as instigated by a service rate of reduction of pressure in brake pipe 4, brake control valve device 3 will respond in a well known manner to such brake pipe reduction by connecting fluid pressure in auxiliary reservoir 5 to delivery pipe 7. This pressure in delivery pipe 7 flows to brake cylinder 2 via inlet passage 6, annular seat 16 of unseated poppet valve 14 in cavity 13, cavity 34, the fluted guide element of check valve 35, and outlet passage 8. This pressure in inlet passage 6 is also connected to the face of proportioning poppet valve 26. Under the assumed full load condition, sufficient force is urged on poppet valve 26 by spring 31 to prevent poppet valve 26 from being unseated. Consequently, there is no pressure connected to volume 11 via passages 36 and 10, so that variable load valve device 1 has no modulating effect upon the buildup of fluid pressure in brake cylinder 2, i.e., modulation of brake cylinder pressure is absent under conditions of full load. This is evident from the graph of FIG. 2.

It should also be noted at this point that cut-off poppet valve 14 is designed with a differential pressure area. Thus, the effective brake pressure in passage 6 and chamber 13 produces a downward acting force differential on poppet valve 14. Spring 23 is selected so that under full load conditions, the degree of spring compression obtained exerts an upward bias force on poppet valve 14 sufficient to overcome this downward force differential until the brake pressure increases to full service value, i.e., 50 psi for a brake pipe charge of 70 psi. At full service brake pressure, the force differential across poppet valve 14 is sufficient to overcome the bias force exerted by spring 23 to effect closure of poppet valve 14. While this closure of cut-off poppet valve 14 has no effect during braking under full load conditions, since complete or full equalization occurs between the auxiliary reservoir and brake cylinder pressures, its function will become clear, as the operation is subsequently explained relative to partial load conditions, in which the modulated brake pressure is less than the equalizing reservoir following a full service application.

BRAKE RELEASE—FULL LOAD

During brake release, as dictated by an increase in brake pipe pressure, control valve device 3 responds to such pressure increase to connect pressure in brake cylinder delivery pipe 7 to atmosphere in a well known manner. If the brake application in effect at the time of brake release is less than a full service application, cut-off poppet valve 14 will remain in its open position, as shown. Pressure in brake cylinder device 2 will, thus, flow to atmosphere via pipe 9, passage 8, cavity 34, passage 6, cavity 13 and pipe 7 to release the brake application in effect.

In the event a full service application is in effect at the time of the brake release, cut-off poppet valve 14 will be in its closed position, as hereinbefore explained, thereby interrupting the above explained release of brake cylinder pressure to atmosphere. However, the pressure under release check valve 25 and ahead of cut-off poppet valve 14 is able to flow to atmosphere. Accordingly, the higher pressure above check valve 25 unseats the check valve so as to bypass cut-off valve 14 in releasing brake cylinder pressure to atmosphere via pipe 9, passage 8, cavity 34, passage 6, cavity 13, passage 24, check valve 25 and pipe 7.

SERVICE BRAKE APPLICATION—PARTIAL LOAD

When a railway vehicle is partially loaded or loaded so that its total weight is less than a weight corresponding to its full load weight, sensing arm 40 of variable load valve device 1 will be rotated in a clockwise direction from its full load position, by reason of springs 23, 31 maintaining engagement of the sensing arm with the unsprung portion of the railway vehicle. Springs 23, 31 thus each exert a reduced force on the respective poppet valves 14, 26 with progressively reduced load conditions.

Figure 2:
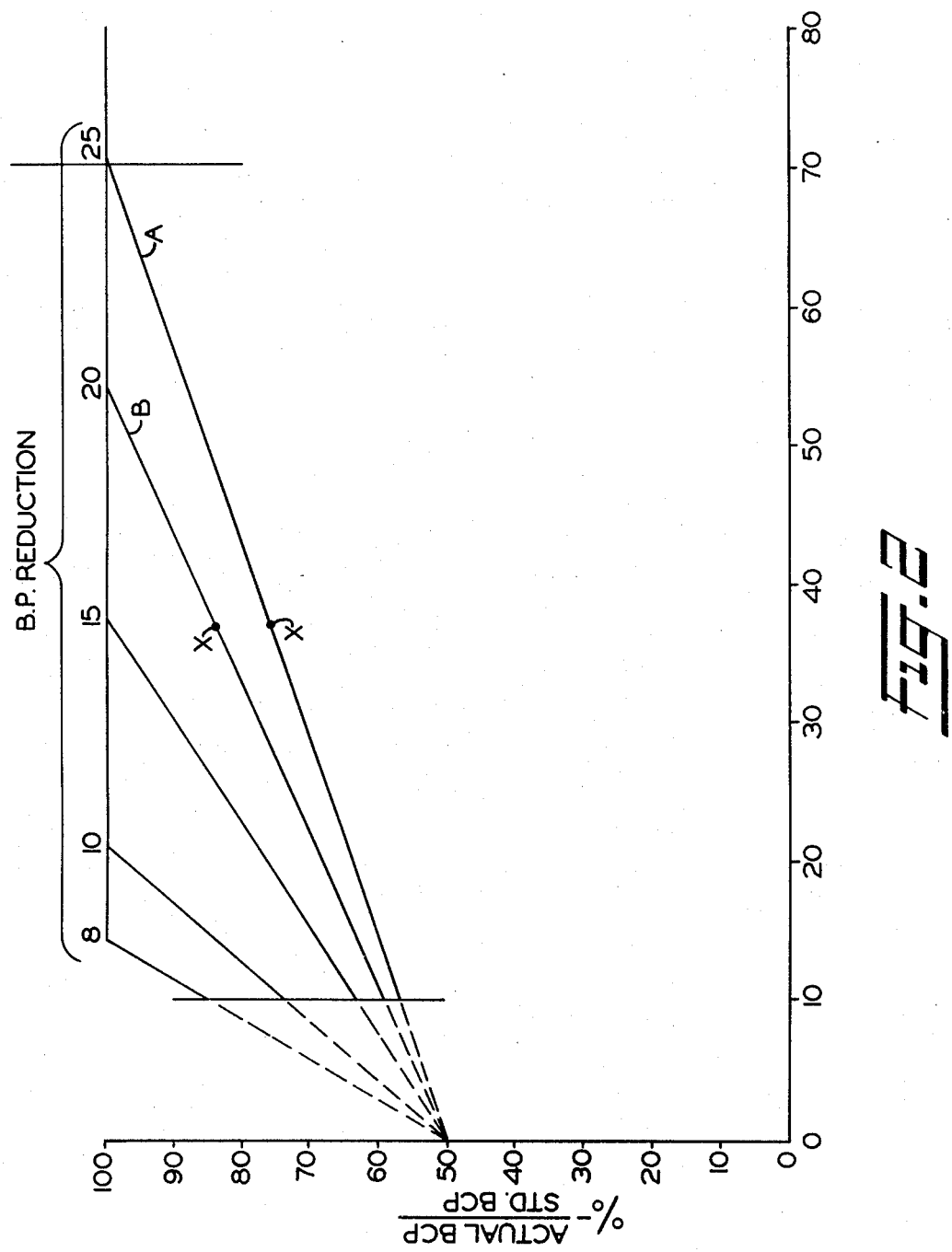
FIG. 2 is a graph representing various brake pressures produced by the variable load valve device of FIG. 1 under different loads.

It can be seen from the graph of FIG. 2, that for a partial load in which spring 31 exerts a force of approximately 37 lbs. on proportioning poppet valve 26, brake applications resulting from reductions of brake pipe pressure less than 15 psi. will develop unmodulated, while applications resulting from brake pipe pressure reductions greater than 15 psi. will be modulated. The degree of brake cylinder pressure modulation increases with increased brake pressure.

If a brake application corresponding to a 20 psi. service brake pipe reduction is made, for example, under the assumed partial load condition, brake control valve device 3 will respond to such brake pipe pressure reduction in the usual manner to connect fluid pressure from auxiliary reservoir 5 to delivery pipe 7. This pressure at inlet pipe 7 flows to brake cylinder 11 via inlet passage 6, unseated poppet valve 14 in cavity 13, and outlet passage 8. This pressure in inlet passage 6 is also connected to the face of proportioning poppet valve 26 and acts in a direction to unseat the poppet valve against the bias load of spring 31, which is adjusted (in accordance with the assumed vehicle load) to 37 lbs. When the pressure acting within the seated area of poppet valve 26 develops sufficient to overcome the force exerted by spring 31, poppet valve 26 will be unseated to allow brake cylinder delivery pressure to flow to branch passage 37 and passage 10 leading to volume reservoir 11. Thus, volume reservoir 11 is momentarily pressurized in parallel with the brake cylinder device 2. This, in effect, increases the brake cylinder volume and consequently reduces the pressure to which brake cylinder device 2 would normally be pressurized. The degree of this pressure modulation is represented in the graph of FIG. 2 in terms of percentage of actual brake cylinder pressure to normal brake cylinder pressure. For the case in question, point X on curve B representing a brake application consistent with a 20 psi. brake pipe pressure reduction indicates that for the assumed load represented by a 37 lb. spring force, the actual brake cylinder pressure developed is 84% of what normal or unmodulated brake cylinder pressure would be, or in other words the brake pressure is modulated by 16%.

It will be noted that the entire upper area of poppet valve 26 is subject to the brake cylinder delivery pressure when the poppet valve is open, whereas the spring side of the poppet valve has a smaller effective pressure area. The volume pressure acting on the spring side of poppet valve 26 combined with the effective load of spring 31 causes poppet valve 26 to close before the volume reservoir pressure builds up to the pressure effective above the poppet valve. The duration poppet valve 26 remains open thus varies with different degrees of brake applications to control the amount of brake cylinder air being "siphoned off" to the volume reservoir 11. For a given load condition, therefore, the degree of modulation of brake cylinder pressure increases as brake application pressure increases above a predetermined level, as shown in the graph of FIG. 2.

It will be seen, for example, that point X on brake application curve A representative of a brake application due to a 25 psi. brake pipe reduction indicates that, for the same partial load as previously assumed (37 lb. spring force), the actual brake cylinder pressure is 84% of normal brake pressure. This represents 16% modulation of brake pressure when making a brake application corresponding to a 20 psi. brake pipe reduction, as compared to a modulation of 24% when making a brake application corresponding to a 25 psi. brake pipe reduction, as noted by point X on curve A representing actual brake pressure that is 76% of normal brake pressure.

Thus, the degree of brake pressure modulation is seen to increase with increased brake pressures.

Inasmuch as brake cylinder pressure is modulated under the assumed conditions, it should be apparent that complete equalization between auxiliary reservoir pressure and brake cylinder pressure will not have occurred when auxiliary reservoir pressure has fallen to the normal full equalization pressure. This means that an overreduction of brake pipe pressure (a reduction below full equalization pressure) will result in the service piston of freight control valve 3 moving from a lap position which it assumes following a partial service brake application, to application position in which the higher auxiliary reservoir pressure is reconnected to the variable load valve inlet passage 6 via pipe 7. In that cut-off poppet valve 14 is designed to close at normal full equalization pressure, however, as hereinbefore mentioned, the pressure supplied to inlet passage 6 is prevented from further equalization with the modulated brake cylinder pressure, thus preserving the modulation level.

This cut-off function holds true, even under different load conditions, which result in different modulated brake pressures, as above explained. For example, if a 20 lb. brake pipe pressure reduction is made under different load conditions (as reflected by the forces exerted by spring 31 in the graph of FIG. 2) it will be seen that the percentage of brake pressure realized will be greater for higher loads. Consequently, as the load changes, so does the compression of spring 23 due to the connection of member 21 with sensing arm 40. The force exerted by the spring 23 thus increases as the modulated brake pressure increases and vice-versa to substantially compensate for changes in the modulated brake pressure acting on the upper face of poppet valve 14 with different vehicle loads. Thus, poppet valve 14 continues to close when the auxiliary reservoir pressure falls to full equalization value regardless of the load condition at the time. The modulation pressure is, therefore, preserved in accordance with the respective load condition during over-reductions of brake pipe pressure.

BRAKE RELEASE—PARTIAL LOAD

During brake release, as dictated by an increase in brake pipe pressure, control valve device 3 responds to such increase to connect pressure in brake cylinder delivery pipe 7 to atmosphere. Assuming proportioning poppet valve 26 has opened to supply a portion of the brake pressure to volume reservoir 11, the reduction of pressure above release check valve 35 during brake release, as previously explained, will allow the check valve to open when the reducing brake cylinder pressure drops slightly below the volume reservoir pressure acting under check valve 35. This assures release of pressure in volume reservoir 11 during each brake release.

Having now described the invention, what I claim as new and desire to secure by Letters Patent, is:

1. For use in a railway vehicle brake control system including a brake pipe, an auxiliary reservoir charged to the pressure of said brake pipe, a brake cylinder, and a brake control valve operative responsive to variations in said brake pipe pressure for supplying fluid pressure from said auxiliary reservoir to said brake cylinder and for releasing fluid pressure therefrom, a variable load valve device interposed between said brake control valve and said brake cylinder, being mounted on either the sprung or unsprung portion of said vehicle and comprising:
(a) passage means having an inlet connected to said brake control valve and an outlet connected to said brake cylinder;
(b) a volume;
(c) a bypass passage connected between said passage means and said volume;
(d) proportioning valve means in said bypass passage for controlling fluid pressure communication between said passage means and said volume;
(e) means for biasing said proportioning valve means toward a closed position in which said communication between said passage means and said volume is interrupted; and
(f) vehicle load sensing means for adjusting said bias means in accordance with the vehicle load, whereby said proportioning valve means is operative from said closed position to an open position in which fluid pressure is connected from said passage means to said volume upon exceeding a value corresponding to the adjusted value of said bias means.

2. A variable load valve device as recited in claim 1, wherein said load sensing means comprises a lever arm pivotally connected at one end thereof to said variable load valve device and engageable at the other end with the opposite of either the sprung or unsprung portion of said vehicle to which said variable load valve device is mounted, so as to rotate in a counterclockwise direction with increased vehicle loading.

3. A variable load valve device as recited in claim 2, further having a bore, said biasing means comprising:
(a) a spring seat member connected to said lever arm and disposed in said bore for movement therein responsive to rotation of said lever arm; and
(b) a spring between said proportioning valve means and said spring seat member, the tension of said spring being adjusted in accordance with the degree of rotation of said lever arm so as to urge said proportioning valve means toward said closed position with a force that varies with the load of said vehicle.

4. A variable load valve device as recited in claim 3, further characterized in that said proportioning valve means comprises a poppet-type valve subject on one side to the fluid pressure supplied to said passage means via said brake control valve and on the opposite side to said spring and to the fluid pressure in said volume.

5. A variable load valve device as recited in claim 4, further characterized in that the effective area of said poppet-type proportioning valve subject to the fluid pressure in said passage means is greater than the effective area subject to the fluid pressure in said volume, whereby the percentage of pressure connected from said passage means to said volume via said proportioning valve is increased as the pressure in said passage means increases.

6. A variable load valve device as recited in claim 1, further comprising a release check valve arranged between said passage means and said bypass passage in parallel with said proportioning valve means to connect fluid pressure in said volume to atmosphere via said brake control valve in bypass of said proportioning valve means.

7. A variable load valve device as recited in claim 2, further comprising:
(a) cut-off valve means in said passage means between said connection of said bypass passage therewith and said brake control valve for controlling fluid pressure communication between said auxiliary reservoir and said brake cylinder via said brake control valve;
(b) means for biasing said cut-off valve means toward an open position; and
(c) said vehicle load sensing means adjusting said bias means in accordance with the vehicle load, whereby said cut-off valve means is operative from said open position to a closed position in which said fluid pressure communication between said auxiliary reservoir and said brake cylinder is terminated when the fluid pressure in said auxiliary reservoir is depleted to a predetermined value.

8. For use in a railway vehicle brake control system including a brake pipe, an auxiliary reservoir charged to the pressure of said brake pipe, a brake cylinder, and a brake control valve operative responsive to variations in said brake pipe pressure for supplying pressure from said auxiliary reservoir to said brake cylinder and for releasing brake cylinder pressure therefrom, a variable load valve device interposed between said brake control valve and said brake cylinder, being mounted on either the sprung or unsprung portion of said vehicle and comprising:
(a) passage means having an inlet connected to said control valve and an outlet connected to said brake cylinder;
(b) a volume;
(c) modulating means for effecting the connection of fluid pressure at said passage means to said volume to modulate brake cylinder pressure according to the vehicle load;
(d) cut-off valve means in said passage means ahead of said modulating means for controlling fluid pressure communication between said auxiliary reservoir and said brake cylinder via said control valve;
(e) means for biasing said cut-off valve means toward an open position; and
(f) vehicle load sensing means for adjusting said bias means in accordance with the vehicle load, whereby said cut-off valve means is operative from said open position to a closed position in which said fluid pressure communication between said auxiliary reservoir and said brake cylinder is terminated when the fluid pressure in said auxiliary reservoir is depleted to a predetermined value.

9. A variable load valve device as recited in claim 8, wherein said load sensing means comprises a lever arm pivotally connected at one end thereof to said variable load valve device and engageable at the other end with the opposite of either the sprung or unsprung portion of said vehicle to which said variable load valve device is mounted, so as to rotate in a counterclockwise direction with increased vehicle loading.

10. A variable load valve device as recited in claim 7 or 9, further having a bore, said biasing means comprising:
(a) a spring seat member connected to said lever arm and disposed in said bore for movement therein responsive to rotation of said lever arm; and
(b) a spring between said cut-off valve means and said spring seat member, the tension of said spring being adjusted in accordance with the degree of rotation of said lever arm so as to urge said cut-off valve means toward said open position with a force that varies with the load of said vehicle.

11. A variable load valve device as recited in claim 10, further characterized in that said cut-off valve means comprises a poppet-type valve subject on one side to said auxiliary reservoir fluid pressure supplied to said passage means via said brake control valve and to said spring acting on said cut-off valve, and on the opposite side to the fluid pressure effective in said brake cylinder.

12. A variable load valve device as recited in claim 11, further characterized in that the effective area of said cut-off poppet valve subject to the fluid pressure in said brake cylinder is greater than the effective area subject to the fluid pressure in said passage means at the inlet thereof.

13. A variable load valve device as recited in claim 12, further characterized in that the relationship between the differential pressure area of said cut-off poppet valve and said spring acting thereon is such that variations in the adjusted tension of said spring with load variations compensates for variations of said modulated brake cylinder fluid pressure with load variations.

14. A variable load valve device as recited in claim 7 or 8, further comprising a release check valve arranged in parallel with said cut-off valve means to connect fluid pressure from said brake cylinder to atmosphere via said control valve when the fluid pressure in said passage means at said inlet thereof is less than the fluid pressure in said passage means at said outlet thereof.

* * * * *